United States Patent
Mudumba

(10) Patent No.: US 11,675,690 B2
(45) Date of Patent: Jun. 13, 2023

(54) LINEAGE-DRIVEN SOURCE CODE GENERATION FOR BUILDING, TESTING, DEPLOYING, AND MAINTAINING DATA MARTS AND DATA PIPELINES

(71) Applicant: Capital One Services, LLC, McLean, VA (US)

(72) Inventor: Venkateshwara Mudumba, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/303,852

(22) Filed: Jun. 9, 2021

(65) Prior Publication Data
US 2022/0398186 A1 Dec. 15, 2022

(51) Int. Cl.
*G06F 11/36* (2006.01)
*G06F 8/30* (2018.01)
*G06F 16/25* (2019.01)
*G06F 8/41* (2018.01)

(52) U.S. Cl.
CPC ............ *G06F 11/3688* (2013.01); *G06F 8/30* (2013.01); *G06F 8/427* (2013.01); *G06F 16/254* (2019.01)

(58) Field of Classification Search
CPC ...... G06F 11/3688; G06F 16/254; G06F 8/30; G06F 8/427
USPC .................................................. 717/120–140
See application file for complete search history.

(56) References Cited

U.S. PATENT DOCUMENTS

| | | | | |
|---|---|---|---|---|
| 7,350,191 B1 * | 3/2008 | Kompella | ................. | G06F 8/61 |
| | | | | 707/999.005 |
| 8,745,583 B2 * | 6/2014 | Ronen | ..................... | G06F 16/90 |
| | | | | 717/125 |
| 8,924,930 B2 * | 12/2014 | Fries | ................... | G06F 9/45558 |
| | | | | 717/102 |
| 9,454,324 B1 * | 9/2016 | Madhavapeddi | ..... | G06F 3/0604 |
| 9,471,404 B1 * | 10/2016 | Ambrosio | ............... | G06F 16/25 |
| 9,594,849 B1 * | 3/2017 | Todd | ....................... | G06F 16/90 |
| 10,162,900 B1 * | 12/2018 | Chatterjee | ............. | G06F 16/334 |
| 10,459,881 B2 * | 10/2019 | Barth | .................... | G06F 16/182 |

(Continued)

OTHER PUBLICATIONS

Fernando et al, WorkfowDSL: Scalable Workfow Execution with Provenance for Data Analysis Applications, IEEE, pp. 774-779 (Year: 2018).*

(Continued)

*Primary Examiner* — Anil Khatri
(74) *Attorney, Agent, or Firm* — Harrity & Harrity, LLP

(57) ABSTRACT

In some implementations, an analytics platform may process a data lineage configuration to identify one or more data sources storing one or more data sets associated with a data analytics use case and identify one or more data relations associated with the one or more data sets. The analytics platform may parse a source code template defining one or more functions to build a data mart and a data pipeline that enables the data analytics use case. The source code template may include one or more tokens to specify elements that define the one or more data sources, data sets, and data relations identified in the data lineage configuration. The analytics platform may automatically generate source code that is executable to build a data mart and a data pipeline to enable the data analytics use case based on the data lineage configuration and the source code template.

20 Claims, 5 Drawing Sheets

(56) References Cited

U.S. PATENT DOCUMENTS

| | | | | |
|---|---|---|---|---|
| 10,481,961 | B1* | 11/2019 | Chapin | G06F 9/54 |
| 10,523,541 | B2* | 12/2019 | Rao | H04L 41/0893 |
| 10,713,272 | B1* | 7/2020 | Caldwell | G06F 16/27 |
| 11,062,022 | B1* | 7/2021 | Kalamkar | G06F 9/45558 |
| 11,210,410 | B2* | 12/2021 | Raphael | G06F 21/6218 |
| 11,308,114 | B1* | 4/2022 | Moghe | G06F 16/254 |
| 11,343,142 | B1* | 5/2022 | Wang | H04L 41/0813 |
| 2018/0052898 | A1* | 2/2018 | Allan | G06N 20/00 |
| 2020/0026710 | A1* | 1/2020 | Przada | G06F 16/254 |
| 2020/0311031 | A1* | 10/2020 | Sim-Tang | G06F 21/6245 |

OTHER PUBLICATIONS

Goel et al, "Application of Big Data analytics in process safety and risk management", IEEE, pp. 1143-1152 (Year: 2017).*

Melnik et al, "Dremel: Interactive Analysis of WebScale Datasets", ACM, pp. 330-339 (Year: 2010).*

Abujabal et al, "Automated Template Generation for Question Answering over Knowledge Graphs", ACM, pp. 1191-1200 (Year: 2017).*

Arora et al, "Automated Checking of Conformance to Requirements Templates Using Natural Language Processing", IEEE, pp. 944-968 (Year: 2015).*

Kotik et al, "Automating Software Analysis and Testing Using a Program Transformation System", ACM, pp. 75-84 (Year: 1989).*

Zhang et al, "Automatically Generating Test Templates from Test Names", IEEE, pp. 506-511 (Year: 2015).*

Underwood, "Data Lineage Handbook 2019," A DataManagement Insight Handbook, 2019, 40 pages [retrieved from https://assets.bwbx.io/documents/users/iqjWHBFdfxlU/rtH7roJgvHyM/v0].

Mukherjee et al., "A Pragmatic Approach to Enterprise-wide Data Lineage—Part 1: Fundamentals," A Global IDs Technical Whitepaper, Oct. 15, 2019, 11 pages [retrieved from https://www.globalids.com/whitepapers/Global-IDs-A-Pragmatic-Approach-to-Enterprise-wide-Data-Lineage-Part-1-of-2-D1001b.pdf].

Mukherjee et al., "A Pragmatic Approach to Enterprise-wide Data Lineage—Part 2: Implementation," A Global IDs Technical Whitepaper, Nov. 21, 2019, 11 pages [retrieved from https://www.globalids.com/whitepapers/Global-IDs-A-Pragmatic-Approach-to-Enterprise-wide-Data-Lineage-Part-2-of-2-D1002b.pdf].

* cited by examiner

LINEAGE-DRIVEN SOURCE CODE GENERATION FOR BUILDING, TESTING, DEPLOYING, AND MAINTAINING DATA MARTS AND DATA PIPELINES

BACKGROUND

In a data analytics context, the term "data mart" generally refers to a structure or access pattern used to retrieve client-facing data in a data warehouse environment. For example, data warehouses are often used as central repositories to integrate data from one or more disparate data sources, and a data mart is typically a curated subset of the data warehouse oriented to a specific data analytics use case (e.g., a specific business unit or group of users, among other examples). Data warehouses and data marts are often built because data sets stored in the disparate data sources are not organized in a way that makes the data readily accessible (e.g., consumable to support different data analytics use cases). For example, one or more extract, transform, load (ETL) and/or extract, load, transform (ELT) processes may be used to build an enterprise-wide data warehouse from data sets stored in disparate data sources, and the data warehouse may then be used as an underlying data source for one or more data marts. Accordingly, because the data stored in a data mart is typically a subset of the data stored in a data warehouse, a data mart may have a smaller and more specialized design than a data warehouse and may support less expensive storage and faster analysis than a data warehouse.

SUMMARY

In some implementations, a system for lineage-driven source generation includes one or more memories and one or more processors, communicatively coupled to the one or more memories, configured to: process a data lineage configuration associated with a data analytics use case, wherein the data lineage configuration is processed to identify structural metadata or serialized parameters that encode information related to one or more data sources that store one or more data sets associated with the data analytics use case and one or more data relations associated with the one or more data sets; parse a source code template that defines one or more functions to build a data mart and a data pipeline that enables the data analytics use case, wherein the source code template is parsed to identify one or more tokens to specify one or more elements that define the one or more data sources, the one or more data sets, and the one or more data relations identified in the data lineage configuration; and generate source code that is executable to build a data mart and a data pipeline to enable the data analytics use case based on the data lineage configuration and the source code template by automatically substituting the one or more elements specified in the data lineage configuration for the one or more tokens in the source code template.

In some implementations, a method for generating source code includes processing, by a device, a data lineage configuration, wherein the data lineage configuration is processed to identify one or more data sources that store one or more data sets associated with a data analytics use case and one or more data relations associated with the one or more data sets, and wherein the data lineage configuration is further processed to identify one or more data processing operations that are applied to the one or more data sets stored in the one or more data sources to implement the data analytics use case; parsing, by the device, a source code template that defines one or more functions to build a data mart and a data pipeline that enables the data analytics use case; generating, by the device, source code that is executable to build a data mart and a data pipeline to enable the data analytics use case based on the data lineage configuration and the source code template, wherein the source code template is parsed to identify one or more language-specific tokens to specify one or more elements that define the one or more data sources, the one or more data sets, the one or more data relations, and the one or more data processing operations identified in the data lineage configuration, and wherein the source code template is generated by automatically substituting language-independent structural metadata or serialized parameters included in the data lineage configuration for the language-specific tokens in the source code template; and executing the source code to build the data mart and the data pipeline from the one or more data sources to the data mart.

In some implementations, a non-transitory computer-readable medium storing a set of instructions includes one or more instructions that, when executed by one or more processors of a device, cause the device to: process a language-independent data lineage configuration associated with a data analytics use case, wherein the language-independent data lineage configuration includes structural metadata or serialized parameters that identify one or more data sources that store one or more data sets associated with the data analytics use case and identify one or more data relations associated with the one or more data sets; process a language-specific source code template that defines one or more functions to build a data mart and a data pipeline that enables the data analytics use case, wherein the language-specific source code template includes one or more tokens to specify elements that define the one or more data sources, the one or more data sets, and the one or more data relations identified in the language-independent data lineage configuration; and generate source code that is executable to build a data mart and a data pipeline to enable the data analytics use case based on the structural metadata or serialized parameters included in the language-independent data lineage configuration and the one or more tokens in the language-specific source code template, wherein the one or more instructions that cause the device to generate the source code further cause the device to: invoke a template substitution engine to replace the one or more tokens in the language-specific source code template with information in the language-independent data lineage configuration that defines the one or more data sources, the one or more data sets, and the one or more data relations associated with the one or more tokens.

DETAILED DESCRIPTION

Figure 1A:
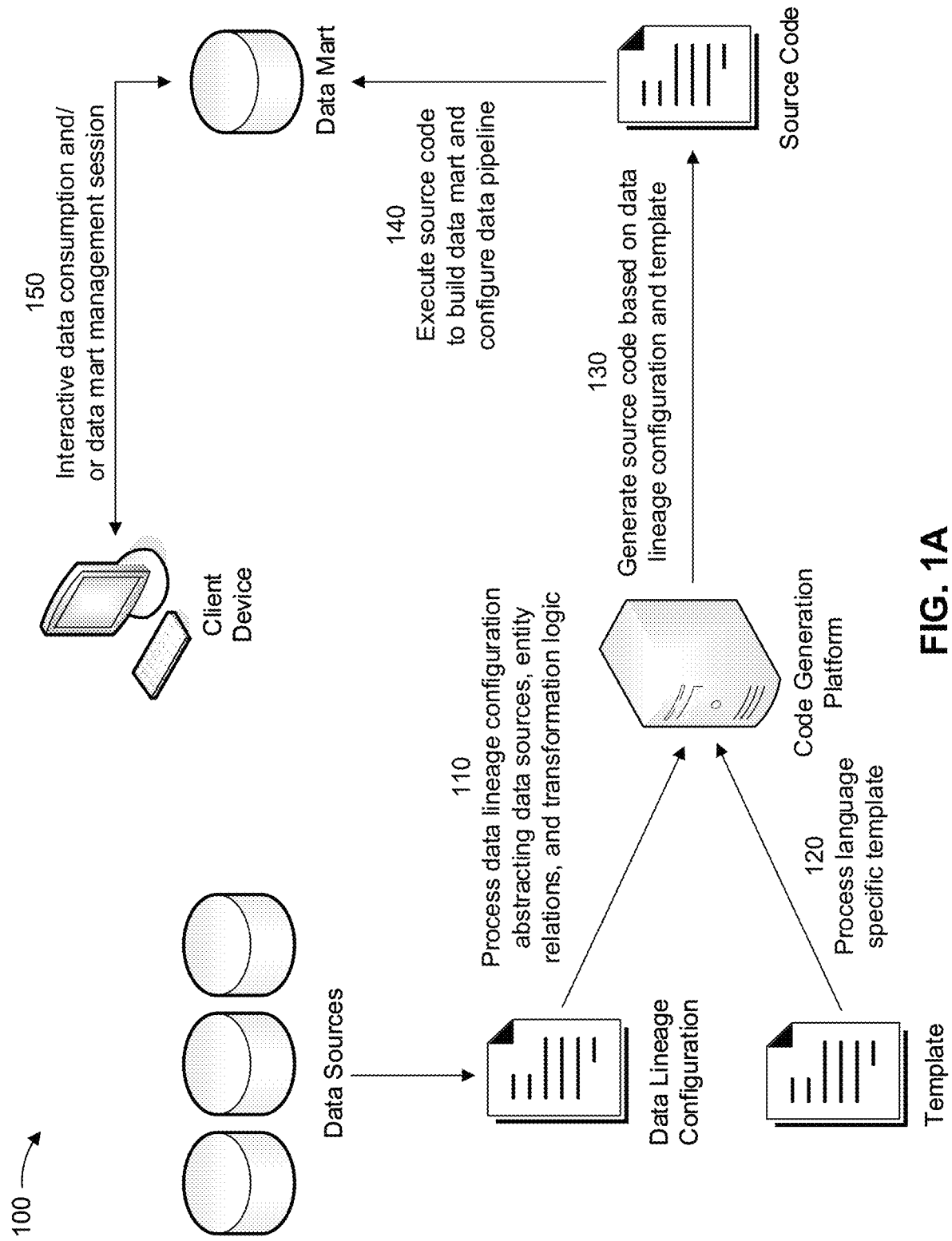
FIGS. 1A-1B are diagrams of an example implementation related to building, testing, deploying, and/or maintaining a data mart and an associated data pipeline based on lineage-driven source code generation.

The following detailed description of example implementations refers to the accompanying drawings. The same reference numbers in different drawings may identify the same or similar elements.

Data warehouses are typically used to store data associated with multiple subject areas and are implemented and controlled by a central unit within an organization (e.g., an information technology group) to assemble data from many data sources. Data marts differ from data warehouses in that a data mart usually provides access to a curated subset of the data in a data warehouse and focuses on a single subject or functional area within an organization (e.g., sales, finance, and/or marketing, among other examples). Accordingly, because data marts are often built with a single-subject focus and controlled by a single department within an organization, data marts usually draw data from relatively few data sources, which may include internal operational systems, a central data warehouse, external data sources, and/or other data marts, among other examples. In a typical data mart lifecycle, steps to implement a data mart include designing the data mart, constructing physical and logical storage structures associated with the data mart, populating the data mart with data from one or more data sources, configuring access to the data mart to enable data analytics, and managing the data mart over time.

However, one significant challenge when managing a data mart lifecycle is the lack of standardized practices to generate source code to build a data mart that houses data in a form that is consumable for analytical purposes. Instead, the source code needed to build a data mart and/or a data pipeline supporting the data mart tends to be based on developer preferences, which can lead to a poorly managed data infrastructure. For example, the source code to build the data mart may become very large in cases where a data pipeline used to populate the data mart includes significant data processing operations (e.g., many transformation, filtering, aggregation, and/or join operations) and/or the data mart is populated using data originating in a large quantity of data sources, which can lead to the source code becoming unwieldy and unmanageable. Furthermore, when the source code to build a data mart and/or a data pipeline is based on developer preferences, there may be little to no visibility into how well (or how poorly) the source code is working in terms of an end-to-end data lineage, which generally relates to the origin of data and how the data changes (e.g., how the data is processed and/or where the data moves throughout the data pipeline). For example, although a well-documented data lineage can provide significant visibility into a data flow and/or data movement from a source to a destination while greatly improving an ability to trace errors back to a root cause in a data analytics process, the data lineage associated with a data mart typically has to be derived by manually analyzing the underlying source code after the data mart has been built and deployed, which is a tedious and error-prone process. Furthermore, if any errors are discovered in the source code, the source code needs to be debugged and retested before redeploying the data mart.

Some implementations described herein relate to a lineage-driven approach to generate source code to build, test, deploy, and/or maintain a data mart and a data pipeline. For example, in some implementations, a code generation platform may programmatically (e.g., automatically) generate source code that can then be executed to build a data mart, and a data pipeline supporting the data mart, based on a data lineage configuration that identifies one or more data sources that store one or more data sets to be used to populate the data mart, one or more data relations among the data sources, and/or one or more data processing operations that are to be performed on the one or more data sets as the data sets move through the data pipeline (e.g., join operations, transformation operations, filtering operations, and/or aggregation operations, among other examples). For example, in some implementations, the code generation platform may receive a source code template that includes one or more tokens (e.g., placeholder elements) to define the data sources, data relations, data processing operations, and/or other aspects of a data mart and/or a data pipeline supporting a data analytics use case, and the code generation platform may perform a template substitution process to substitute elements in the data lineage configuration for the tokens in the source code template.

In this way, some implementations described herein may standardize and automate source code generation using a language-agnostic lineage-driven configuration and a language-specific template. In this way, the lineage-driven source code can be used to maintain a data mart having any suitable size with strong governance and controls. Furthermore, using data lineage to drive source code generation may significantly simplify data management challenges that relate to documenting and tracing the data lineage, which is usually documented after a code infrastructure has been built when a preference-based coding approach is used. Accordingly, as described in further detail herein, some implementations may provide lineage-driven source code generation that may result in a well-managed data infrastructure with robust organizational continuity by reducing reliance on subject matter experts, reducing code development, testing, and deployment time, providing scalability and reusability across different data mart use cases (e.g., different data analytics use cases), enabling interactive lineage-driven data production and/or data consumption sessions, and/or managing data components and/or traceability of the data components associated with a data mart and/or a data pipeline, among other examples.

Figure 1B:
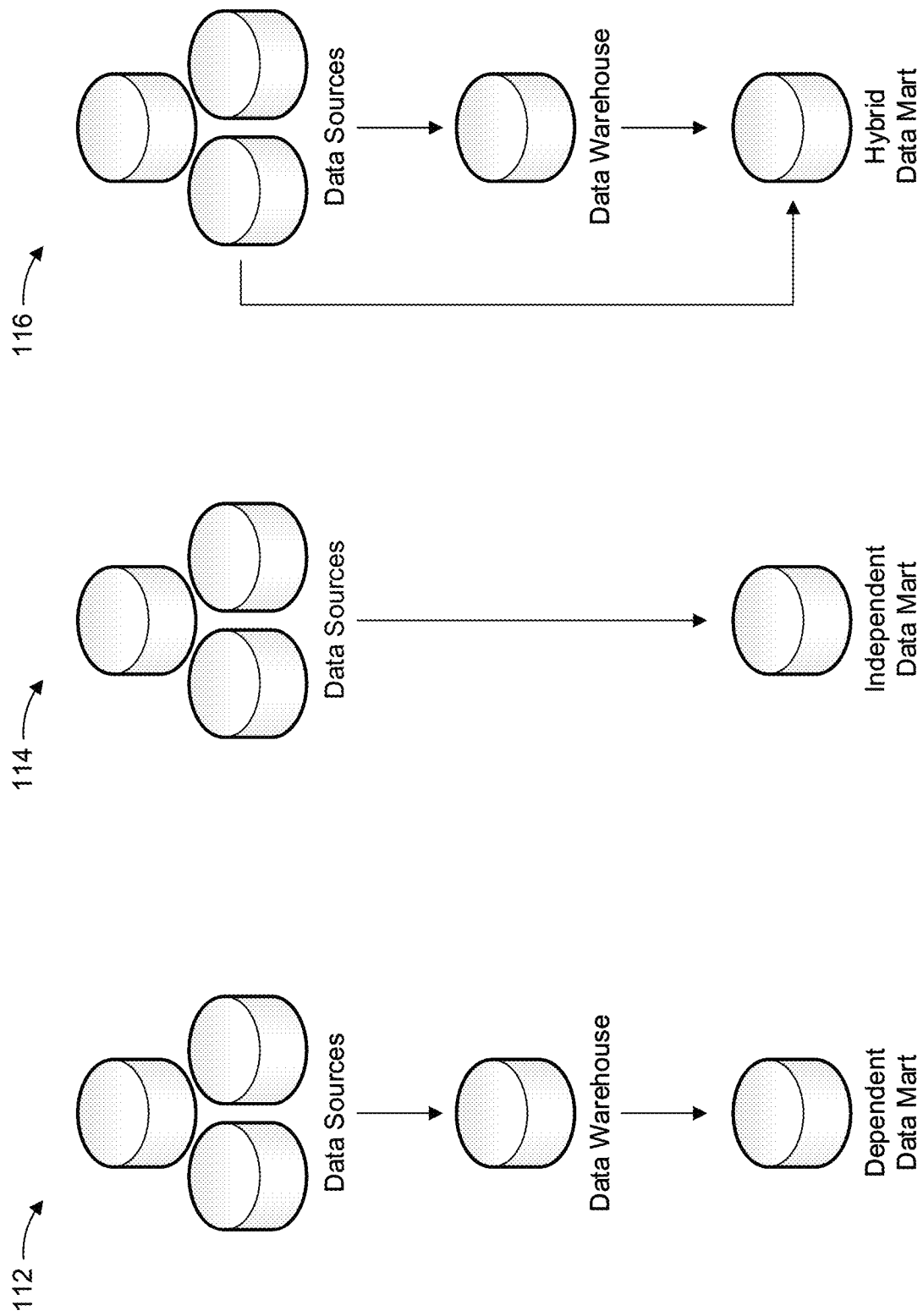

FIGS. 1A-1B are diagrams of an example implementation 100 related to building, testing, deploying, and/or maintaining a data mart and an associated data pipeline based on lineage-driven and template-drive source code generation. As shown in FIGS. 1A-1B, example implementation 100 includes a code generation platform, one or more data sources, a data warehouse, a data mart, and a client device. The code generation platform, data sources, data warehouse, data mart, and client device are described in more detail in connection with FIG. 2.

As shown in FIG. 1A, and by reference number 110, the code generation platform may process a data lineage configuration that abstracts one or more data sources, entity relations, and transformation logic. In particular, as described in further detail herein, the code generation platform may receive the data lineage configuration as an input, and the data lineage configuration may generally include various parameters to specify or otherwise define a data origin and a data pipeline associated with a data mart to be built and deployed to support a data analytics use case. For example, in some implementations, the data lineage configuration may include one or more configuration files that use a standard syntax, data structure, and/or serialization format (e.g., JavaScript Object Notation (JSON), Extensible Markup Language (XML), and/or YAML Ain't Markup Language (YAML)) to provide an in-depth description related to where one or more data sets associated with the data mart originate, including an analytic lifecycle associated with the one or more data sets. Accordingly, the data lineage configuration may generally encode an end-to-end data flow associated with the data sets that are to be used to populate the data mart, including how the data sets flow from one or more data sources to the data mart in one or more hops and any data processing operations that are performed on the one or more data sets in and/or between the one or more hops towards the data mart.

For example, FIG. 1B illustrates various example data mart configurations, and the data lineage configuration that is provided to the code generation platform may generally depend on the particular configuration of the target data mart to be built based on the data lineage configuration. For example, as shown by reference number 112, the data mart may be configured as a dependent data mart that draws data from a central data warehouse. The dependent data mart may have a top-down design that starts with performing one or more extract, transform, load (ETL) and/or extract, load, transform (ELT) processes to extract data sets from one or more operational data sources, which may include one or more data repositories, cloud environments, on-premises environments, application-specific data repositories, mobile devices, customer relationship management systems, and/or other suitable data sources. In some implementations, the one or more data sources may use heterogeneous and/or homogeneous data organizations and/or data formats to store the data sets, and one or more extraction tasks may be configured to ingest data from the data source(s) and convert the extracted data records to a data stream in which the extracted data records have a common format to enable subsequent transformation processing and loading into the data warehouse.

In some implementations, one or more data processing operations may then be performed to apply rules, policies, and/or other functions to the data extracted from the data source(s) in order to prepare the data records for loading into the data warehouse. For example, in some implementations, the data processing operations may include one or more join operations, transformation operations, filtering operations, and/or aggregation operations that are performed on the data sets extracted from the data sources. Accordingly, in some implementations, the data processing operations may be used to cleanse the data sets extracted from the data sources to remove inconsistencies, correct missing values, apply formatting rules to standardize a format of the extracted data sets, perform deduplication to exclude or discard redundant data records, perform verification to remove unusable data records and/or flag anomalies in the content of the data records, perform sorting or ordering to organize the data records according to type or other criteria, join data from multiple data sources, aggregate data to summarize multiple rows of data, and/or perform transposing or pivoting to convert multiple columns into multiple rows (or vice versa), among other examples. In some implementations, the one or more data sets may be stored in one or more staging tables or intermediate sources while the data processing operations are performed on the data sets prior to loading the data sets into the data warehouse.

Accordingly, to create a dependent data mart to support a particular data analytics use case, one or more data sets may be exported from the data warehouse, and one or more data processing operations (e.g., join operations, aggregation operations, filtering operations, and/or transformation operations) may be performed to restructure and load the data sets into the dependent data mart where a client device can access and query the data stored in the dependent data mart. For example, a dependent data mart may be a logical view and/or a physical view of a subset of the data stored in the data warehouse, where "logical view" refers to a virtual table or view that is logically separated from the data warehouse and "physical view" refers to extracted data that is stored in a database that is physically separate from the data warehouse.

Additionally, or alternatively, as shown by reference number 114, the data mart may be associated with an independent data mart configuration, in which case the independent data mart may be built as a standalone system that focuses on a particular data analytics use case without relying upon a data warehouse between the independent data mart and the data sources that store the data sets used to populate the data mart. In such cases, the data sets may be extracted from the data sources, processed, and loaded to the independent data mart where the data sets may be stored for consumption in relation to the appropriate data analytics use case. Additionally, or alternatively, as shown by reference number 116, the data mart may be associated with a hybrid data mart configuration, in which case the hybrid data mart may combine data from a data warehouse with data sets stored in other data sources (possibly including other data marts). In general, the hybrid data mart configuration may combine the speed and end-user focus of a dependent data mart with the organization-level integration of an independent data mart.

Accordingly, depending on the design configuration of the target data mart (e.g., dependent, independent, or hybrid), the data lineage configuration may generally identify one or more data sources that store one or more data sets associated with a data analytics use case (including any data warehouse(s) and/or intermediate data containers in a data pipeline between the one or more data sources and the target data mart). Furthermore, in some implementations, the data lineage configuration may identify one or more data relations associated with the one or more data sets (e.g., data paths through which the data sets flow through a data pipeline from the one or more data sources to the target data mart) and/or one or more data processing operations that are applied to the one or more data sets as the data sets flow through the data pipeline. Accordingly, in some implementations, the data lineage configuration may provide a detailed trail of the data sets used to populate the target data mart, which may be represented using structured metadata and/or text that is structured using a data serialization language (e.g., JSON, XML, and/or YAML, among other examples). For example, in some implementations, the structured metadata and/or serialized parameters that are used to represent the data lineage of the target data mart may identify any data sources where the data sets originate and/or any intermediate systems that the data sets interact with in the data pipeline towards the data mart. Furthermore, the data lineage configuration may include technical metadata, serialized parameters, and/or other information to provide details related to historical behavior, attribute properties, trends, data quality, and/or data processing operations, among other examples, associated with the data sets at each hop in the data pipeline. For example, the data lineage configuration may encode information related to one or more join operations, one or more pre-join and/or post-join transformation operations, one or more pre-join and/or post-join filter operations, and/or one or more pre join and/or post-join aggregation operations that are performed at each hop in the data pipeline. In some implementations, the data lineage configuration may further encode information related to an order in which the various data processing operations are applied to the one or more data sets in the data pipeline from the data sources to the data mart. Furthermore, in some implementations, the data lineage configuration may encode information related to data quality test results, reference data values, data models, business vocabularies, and/or any other relevant information linked to the various hops in the data pipeline and/or the data processing operations that are performed at the various hops in the data pipeline.

In some implementations, the data lineage configuration that is received by the code generation platform may have a standardized structure and/or a standardized format for the structured metadata and/or serialized parameters that are used to encode the data sources associated with the data analytics use case, the data relations associated with the data sets that flow from the data sources to the target data mart (e.g., one-to-one, one-to-many, many-to-one, and/or many-to-many data relations), the data processing operations that are applied to the data sets as the data sets move through the data pipeline, and/or any other lineage information that may be represented in the data lineage configuration. Accordingly, in some implementations, the code generation platform may provide one or more utilities to create, modify, and/or verify the syntax of the data lineage configuration for a data mart associated with a particular data analytics use case. For example, in some implementations, the one or more utilities may perform a pattern-based data lineage technique that analyzes metadata for tables, columns, and/or reports to identify patterns in the metadata, a tagging-based data lineage technique that applies tags or marks to track how data in the data pipeline is transformed and/or moved from start to finish, a self-contained data lineage technique that maintains a self-contained data repository (e.g., a data lake) to store raw data in a native format over all stages of its lifecycle, and/or a parsing-based data lineage technique that automatically reads programming logic used to process data to reverse engineer data transformation logic to perform comprehensive end-to-end data tracing.

Accordingly, in order to identify a complete end-to-end lineage for the data sets to be used to populate a data mart for a particular data analytics use case, the data lineage configuration received by the code generation platform may have a standardized structure and/or a standardized format to represent the data origin, data flow from the data origin to the data mart, and the end-to-end data processing operations performed on the data sets to be used to populate the data mart. For example, in some implementations, the data lineage configuration may identify the data sources storing the data sets to be used to populate the data mart and/or any intermediate hops between the data sources and the data mart based on a tracked data flow within data ingestion jobs that are performed throughout the data pipeline. Furthermore, the data lineage configuration may represent specific data processing operations performed on the data sets and the results of the data processing operations, a query history that includes user queries, automated reports, filters, joins, aggregations, and/or other operations performed throughout the data pipeline, and/or metrics that track user access to different object types, user access to different data fields, and/or security or governance issues.

As further shown in FIG. 1A, and by reference number 120, the code generation platform may process a language-specific source code template that defines one or more functions to build a data mart that enables the data analytics use case associated with the data lineage configuration. For example, the source code template may define one or more data mart construction functions to create physical and/or logical storage structures associated with the data mart (e.g., tablespaces, schema objects, indexes, fields, and/or access controls). Furthermore, in some implementations, the source code template may define one or more data mart population functions to obtain the data sets from the appropriate source(s), map data sources to target data structures, clean the data sets and/or properly format the data sets for consumption, and/or move the data sets into the data mart. Additionally, in some implementations, the source code template may define one or more data mart access functions to configure a graphical front-end to enable users to query the data mart, to configure an intermediate metalayer for the graphical front-end to translate database structures and object names into terms that relate to the data analytics use case, and/or to manage database structures such as summarized tables that enable fast and efficient execution for queries submitted through the graphical front-end. In another example, in some implementations, the source code template may define one or more management functions to manage the data mart over a lifecycle (e.g., providing secure access to the data mart, ensuring fault tolerance for potential system failures). Furthermore, as described in further detail below, the source code template may define one or more functions to enable interactive data production and/or data consumption sessions using the data mart and/or provide a web-based user interface to manage a detailed data mart history.

In some implementations, the data lineage configuration and/or the source code template processed by the code generation platform may be configured to serve a particular data analytics use case. In some implementations, the code generation platform may obtain the data lineage configuration and/or the source code template from one or more data repositories that store libraries of data lineage configurations and/or source code templates that can be used to generate the source code to build a target data mart for a particular data analytics use case. In cases where the data lineage configuration and/or the source code template is created on-demand to serve a specific data analytics use case, the data lineage configuration and/or the source code template may be added to the libraries in the one or more data repositories such that the data lineage configuration and/or the source code template can be reused and/or repurposed to built a data mart for another suitable data analytics use case. Furthermore, the source code template may be structured to generate source code that can be compiled, interpreted, and/or executed to build a data mart in a manner that satisfies one or more constraints associated with a configuration of the data mart (e.g., constraints related to data format, accessibility, and/or presentation, among other examples).

As further shown in FIG. 1A, and by reference number 130, the code generation platform may generate source code based on the data lineage configuration and the language-specific source code template. For example, in some implementations, the functions defined in the language-specific source code template may be associated with a query execution engine (e.g., Structured Query Language (SQL™), Python™, Java™, Scala™, and/or Spark™), and the source code template may include one or more tokens (e.g., placeholder elements) to represent variables, arguments, and/or other programming elements that correspond to data lineage elements. Accordingly, in some implementations, the code generation platform may perform or invoke a template substitution engine configured to substitute which elements in the data lineage configuration for the appropriate tokens in the language-specific source code template. For example, in some implementations, the template substitution engine may be configured to parse the source code template (e.g., based on a syntactic analysis of the language-specific source code template) to identify one or more tokens, variables, and/or other parameters that take values based on data lineage information. Furthermore, the template substitution engine may determine one or more elements (e.g., metadata elements and/or serialized parameters) in the data lineage configuration that provide the relevant values for the tokens, variables, and/or other parameters to be substituted into the source code template. Accordingly, the template substitution engine may process the elements in the data lineage configuration to conform to the grammatical, syntactical, structural, and/or other language-dependent rules associated with the language-specific source code template. In this way, the data lineage configuration may provide a language-agnostic or language-independent abstraction of data sources, data relations, data processing operations, and/or other lineage-driven data elements associated with a target data mart, and the source code template may be written using a particular language associated with a query execution engine such that the source code template may take the data lineage configuration as an input and programmatically generate executable source code as an output by replacing tokens in the source code template with information in the data lineage configuration that defines the data sources, data sets, data relations, data processing operations, and/or other lineage-based features of the data mart.

As further shown in FIG. 1A, and by reference number 140, the code generation platform may execute the source code that is generated based on the data lineage configuration and the language-specific source code template to build a data mart associated with a data analytics use case and to configure a data pipeline that supports the data mart. For example, in some implementations, the code generation platform may execute (e.g., after compilation, if necessary) the data mart construction functions, the data mart population functions, the data mart access functions, the data mart management functions, and/or any other suitable functions that are defined in the source code that is generated based on the data lineage configuration and the language-specific source code template. In this way, the data mart and the data pipeline to support a particular data analytics use case may be developed, built, tested, and deployed using a lineage-driven and template-driven approach that standardizes data mart source code generation. In this way, rather than documenting a data lineage after a code infrastructure has been built, the lineage-driven and template-driven approach described herein initially defines the data lineage of a data mart and uses the data lineage (e.g., as defined in the data lineage configuration) to drive source code generation. In this way, the lineage-driven and template-driven approach can be used to build, test, deploy, and maintain a data mart of any suitable size with robust governance and controls. Furthermore, the lineage-driven and template-driven approach may be used to automatically generate one or more test cases to validate the source code and/or the data pipeline that is configured by executing the source code. For example, the one or more test cases may include a set of inputs and a set of expected outputs that are automatically generated based on the data lineage configuration. In this way, the code generation platform may validate whether the source code that is generated from the data lineage configuration and the language-specific source code template matches an intent of the data mart. In this way, in cases where the actual outputs from executing the test case(s) deviate from the expected outputs, the data lineage configuration and the source code template can be reviewed to identify and/or correct issues that are causing the actual outputs to deviate from the expected outputs.

Accordingly, some implementations described herein may provide a standardized data mart source code development approach that puts data lineage first and uses the data lineage configuration to drive source code generation, which may enable a well-managed data mart infrastructure with robust organizational continuity by avoiding reliance on subject matter experts. Furthermore, data mart developers and validators may experience reduced code development, testing, and deployment times because development, testing, deployment, and/or documentation processes are automated or reusable across different data marts that may serve different data analytics use cases. For example, a developer that follows the lineage-driven and template-driven approach to build a data mart and data pipeline for one data analytics use case may follow the same approach to build data marts and data pipelines for any other data analytics use case. This may improve return on investment, enable faster and more efficient code development, testing, bug detection, and bug fixing, and/or enable more consistent and seamless deployment and rigorous data governance across different data analytics use cases. Furthermore, by using the lineage-driven and template-driven approach described herein, the source code that is generated and executed to build a data mart may have a uniform style, syntax, and/or structure, which may significantly simplify processes to manage the code base.

As further shown in FIG. 1A, and by reference number 150, the client device may access the data mart in an interactive data consumption and/or data mart management session. For example, as described above, the data mart may be built and deployed based on source code that is generated based on a data lineage configuration that defines an end-to-end data lineage associated with one or more data sets that are used to populate the data mart. Accordingly, the data lineage configuration may enable the data mart to support one or more interactive utilities that may receive a user input that includes one or more requests related to the data lineage configuration and/or the data processing operations that are applied to the one or more data sets to implement a data analytics use case and generate, based on the data lineage configuration, an interactive response to the request that includes details related to the data lineage configuration and/or details related to the one or more data processing operations that are applied to the one or more data sets to implement the data analytics use case. For example, in some implementations, the interactive utilities may be configured to provide a self-service tool (e.g., a virtual assistant) that enables a user of a client device to provide a voice-based input, a query, and/or another suitable input to request information to aid the user in understanding the data lineage, data testing, and/or data monitoring associated with a specific data processing operation and/or a group of data processing operations. In this example, the interactive utilities may provide a voice or visual response that provides details related to the data stored in the data mart, the metadata in the data lineage configuration, and/or any other suitable information related to a data lineage from a data origin to the data mart (e.g., audio, video, or other media to indicate how the data pipeline is operating). In another example, the interactive utilities may include a text-based utility that automatically generates lineage-based documentation for any suitable query or data analytics that may be performed using the data mart. Additionally, or alternatively, the interactive utilities may be used to create automated test cases to validate data integrity, check data quality, check business rules, enable continuous integration/continuous delivery or continuous deployment (CICD) processes, create metrics in the data mart that can be provided to the client device on-demand, and/or provide integration with reporting tools.

As described above, in some implementations, the client device may interact with the data mart in a data mart management session, which may be used to manage a lifecycle of the data mart after the data mart has been built and deployed in an organization. For example, as described above, the data mart may be built using source code that is programmatically generated based on a data lineage configuration and a language-specific source code template, and the source code may be executed to build various objects in the data mart, including different tables and views that provide access to the underlying data exported from the data sources through the data pipeline. Accordingly, in some implementations, the data mart may be configured to maintain an audit history that tracks interactions with the data mart over time based on the data lineage configuration, which may enable traceability for the data sets that are used to populate the data mart and interactions to access and/or modify the data sets populating the data mart. For example, the data mart management session may provide a web-based user interface to manage any suitable component of the data mart based on the data lineage configuration. For example, the web-based user interface may enable change controls to be implemented based on the data sources, data relations, and/or data processing operations defined in the data lineage configuration, provide controls to add, edit, approve, and/or revoke changes to the data mart, provide an audit history that includes details associated with every interaction with the data mart, and/or provide an interactive lineage creation tool, among other examples.

As indicated above, FIGS. 1A-1B are provided as an example. Other examples may differ from what is described with regard to FIGS. 1A-1B.

Figure 2:
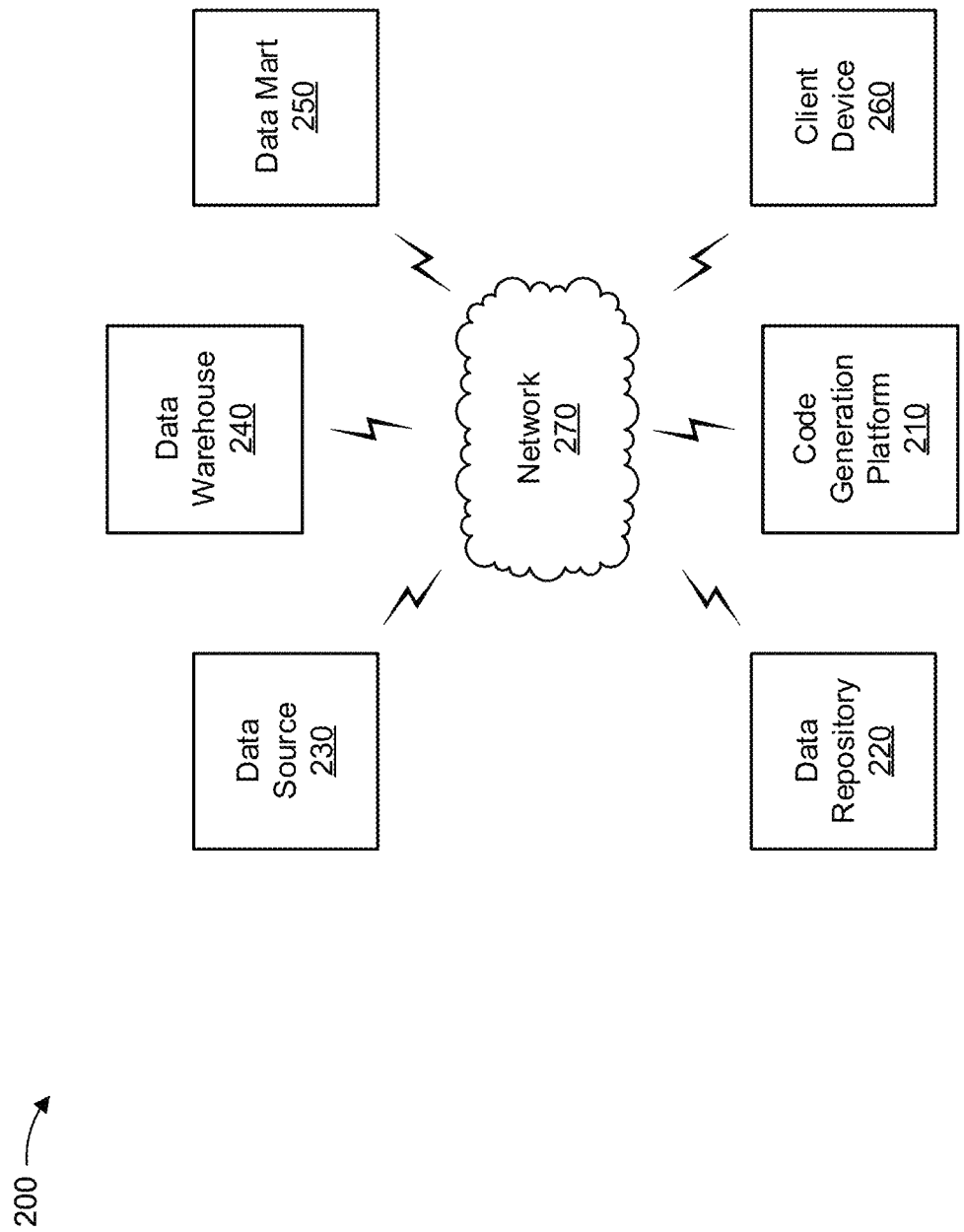
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a code generation platform 210, a data repository 220, a data source 230, a data warehouse 240, a data mart 250, a client device 260, and a network 270. Devices of environment 200 may interconnect via wired connections, wireless connections, or a combination of wired and wireless connections.

The code generation platform 210 includes one or more devices capable of receiving, generating, storing, processing, providing, and/or routing information associated with building, testing, deploying, and/or maintaining a data mart and an associated data pipeline based on source code that is generated from a language-agnostic data lineage configuration and a language-specific source code template, as described in more detail elsewhere herein. The code generation platform 210 may include a communication device and/or a computing device. For example, the code generation platform 210 may include a server, such as an application server, a client server, a web server, a database server, a host server, a proxy server, a virtual server (e.g., executing on computing hardware), or a server in a cloud computing system. In some implementations, the code generation platform 210 includes computing hardware used in a cloud computing environment.

The data repository 220 includes one or more storage devices capable of receiving, generating, storing, processing, and/or providing information associated with a language-agnostic data lineage configuration and a language-specific source code template that can be provided as inputs to the code generation platform 210 to generate source code for building, testing, deploying, and/or maintaining a data mart and an associated data pipeline, as described elsewhere herein. The data repository 220 may include a database engine, a database, a data center, a cloud computing resource, a table, a list, and/or a data structure.

The data source 230 includes one or more storage devices capable of receiving, generating, storing, processing, and/or providing information associated with one or more data sets that may be used to populate a data mart that is built from source code that is programmatically generated based on a language-agnostic data lineage configuration and a language-specific source code template, as described elsewhere herein. The data source 230 may include a database engine, a database, a data center, a cloud computing resource, a table, a list, and/or a data structure.

The data warehouse 240 includes one or more storage devices capable of receiving, generating, storing, processing, and/or providing information associated with one or more data sets that may be used to populate a data mart that is built from source code that is programmatically generated based on a language-agnostic data lineage configuration and a language-specific source code template, as described elsewhere herein. The data warehouse 240 may include a database engine, a database, a data center, a cloud computing resource, a table, a list, and/or a data structure.

The data mart 250 includes one or more storage devices capable of receiving, generating, storing, processing, and/or providing information associated with one or more data sets that may be exported from the data source 230 and/or the data warehouse 240 based on source code that is programmatically generated based on a language-agnostic data lineage configuration and a language-specific source code template, as described elsewhere herein. The data mart 250 may include a database engine, a database, a data center, a cloud computing resource, a table, a list, and/or a data structure.

The client device 260 includes one or more devices capable of receiving, generating, storing, processing, and/or providing information associated with a data mart and an associated data pipeline based on source code that is generated from a language-agnostic data lineage configuration and a language-specific source code template, as described in more detail elsewhere herein. The client device 260 may include a communication device and/or a computing device. For example, the client device 260 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 270 includes one or more wired and/or wireless networks. For example, the network 270 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 270 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
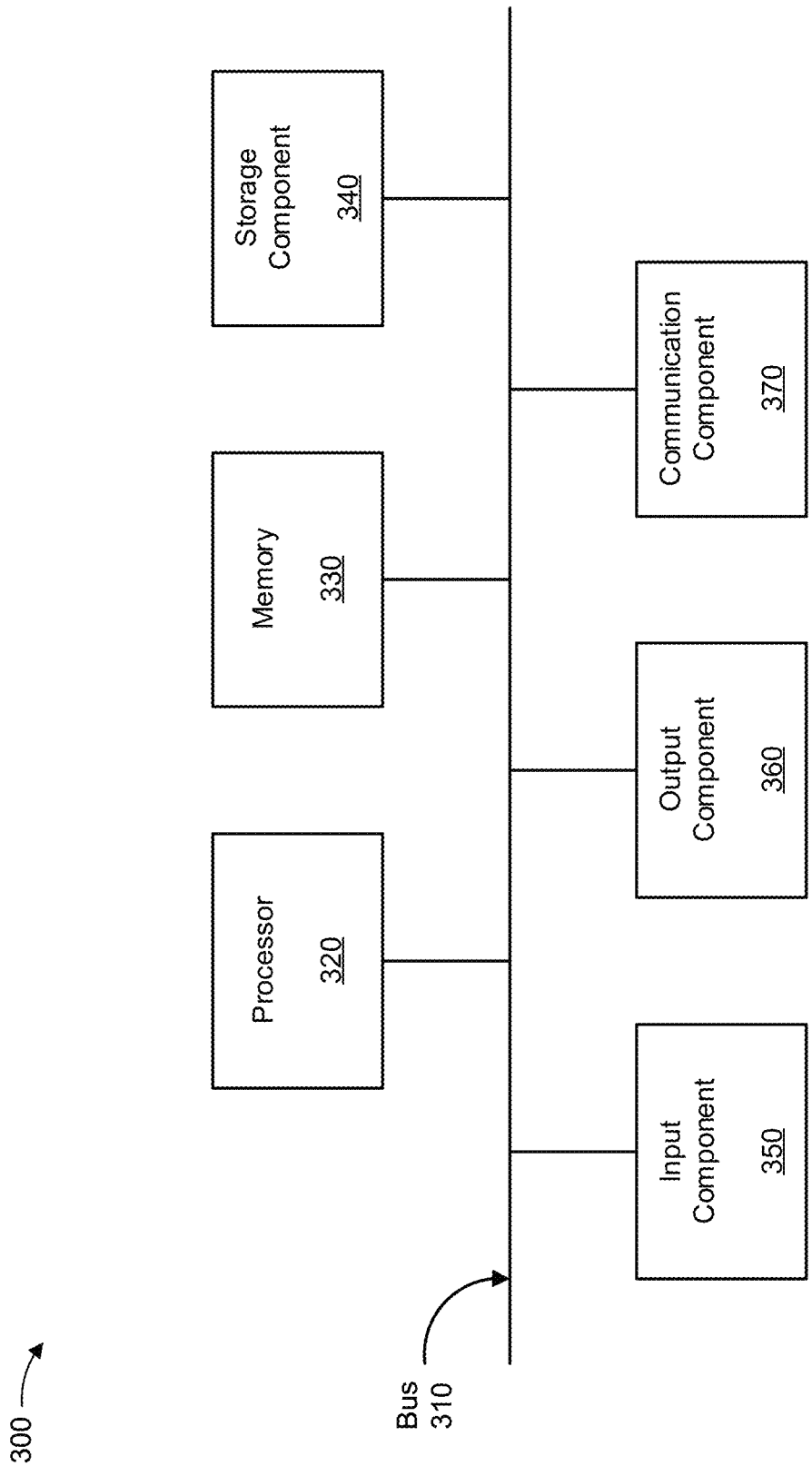
FIG. 3 is a diagram of example components of one or more devices of FIG. 2.

FIG. 3 is a diagram of example components of a device 300, which may correspond to code generation platform 210, data repository 220, data source 230, data warehouse 240, data mart 250, and/or client device 260. In some implementations, code generation platform 210, data repository 220, data source 230, data warehouse 240, data mart 250, and/or client device 260 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
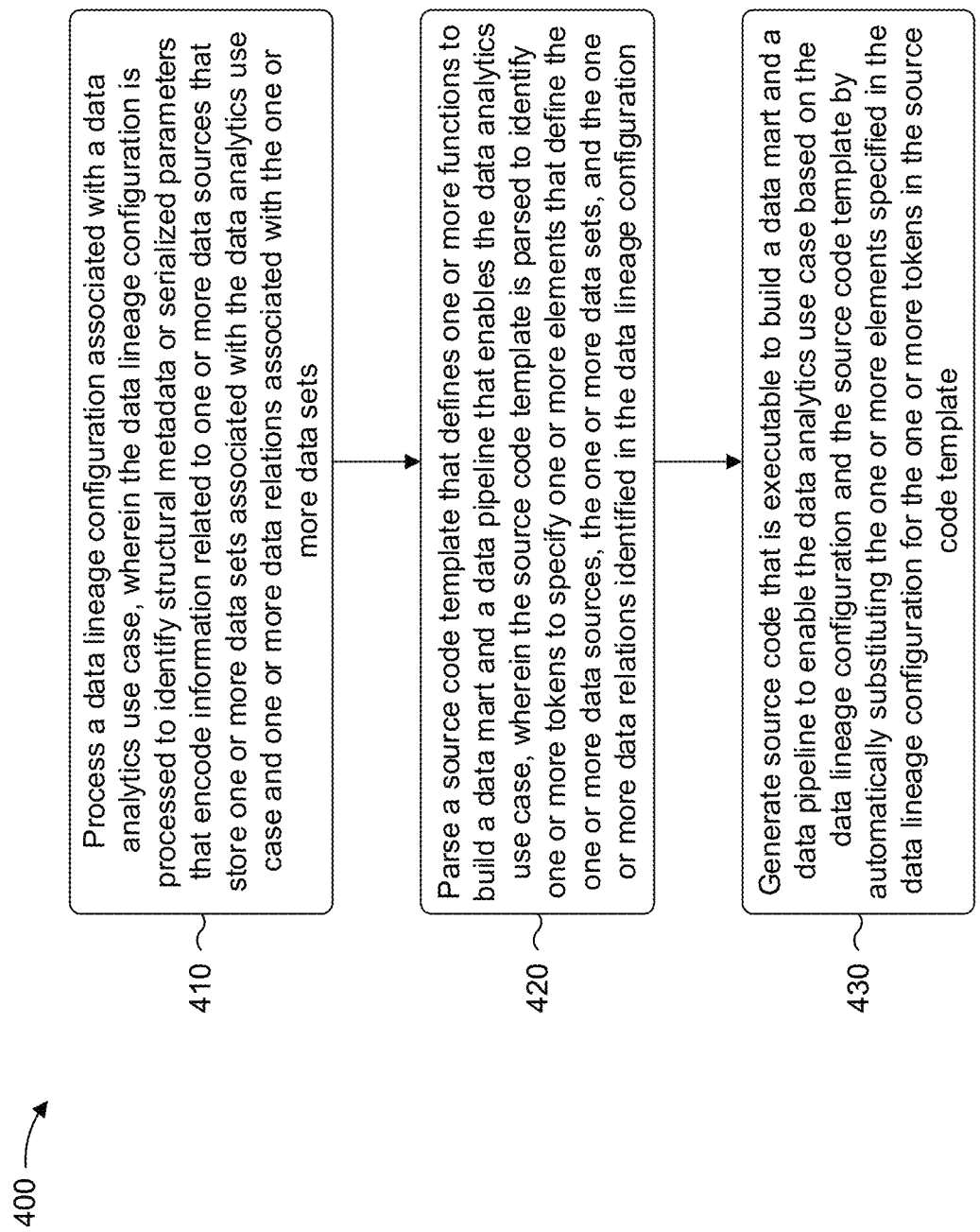
FIG. 4 is a flowchart of an example process related to building, testing, deploying, and/or maintaining a data mart and an associated data pipeline based on lineage-driven source code generation.

FIG. 4 is a flowchart of an example process 400 related to building, testing, deploying, and/or maintaining a data mart and an associated data pipeline based on lineage-driven source code generation. In some implementations, one or more process blocks of FIG. 4 may be performed by a code generation platform (e.g., code generation platform 210). In some implementations, one or more process blocks of FIG. 4 may be performed by another device or a group of devices separate from or including the code generation platform, such as data repository 220, data source 230, data warehouse 240, data mart 250, and/or client device 260. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include processing a data lineage configuration associated with a data analytics use case (block 410). In some implementations, the data lineage configuration may be processed to identify structural metadata or serialized parameters that encode information related to one or more data sources that store one or more data sets associated with the data analytics use case and to identify one or more data relations associated with the one or more data sets. As further shown in FIG. 4, process 400 may include parsing a source code template that defines one or more functions to build a data mart and a data pipeline that enables the data analytics use case (block 420). In some implementations, the source code template may be parsed to identify one or more tokens to specify one or more elements that define the one or more data sources, the one or more data sets, and the one or more data relations identified in the data lineage configuration. As further shown in FIG. 4, process 400 may include generating source code that is executable to build a data mart and a data pipeline to enable the data analytics use case based on the data lineage configuration and the source code template (block 430). For example, in some implementations, the source code may be generated by automatically substituting the one or more elements specified in the data lineage configuration for the one or more tokens in the source code template. Additionally, or alternatively, the source code may be generated by invoking a template substitution engine configured to automatically replace the one or more tokens in the source code template with information that defines the one or more data sources, the one or more data sets, and the one or more data relations based on the structural metadata or serialized parameters encoded in the data lineage configuration and based on one or more rules specific to a programming language associated with the source code template.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for lineage-driven source generation, the system comprising:
    one or more memories; and
    one or more processors, communicatively coupled to the one or more memories, configured to:
        process a data lineage configuration associated with a data analytics use case,
            wherein the data lineage configuration is processed to identify structural metadata or serialized parameters that encode information related to one or more data sources that store one or more data sets associated with the data analytics use case and one or more data relations associated with the one or more data sets;
        parse a source code template that defines one or more functions to build a data mart and a data pipeline that enables the data analytics use case,
            wherein the source code template is parsed to identify one or more tokens to specify one or more elements that define the one or more data sources, the one or more data sets, and the one or more data relations identified in the data lineage configuration;
        automatically generate after parsing the source code template, source code that is executable to build the data mart and the data pipeline to enable the data analytics use case based on the data lineage configuration and the source code template by automatically substituting the one or more elements specified in the data lineage configuration for the one or more tokens in the source code template;
        validate, based on automatically generating one or more test cases, the source code or the data pipeline,
            wherein the one or more test cases include a set of inputs and a set of expected outputs that are generated based on the data lineage configuration; and
        generate, based on the data lineage configuration, an interactive response that includes details related to the data lineage configuration or details related to one or more data processing operations that are applied to the one or more data sets to implement the data analytics use case.

2. The system of claim 1, wherein the one or more processors are further configured to:
    execute the source code to build the data mart and the data pipeline from the one or more data sources to the data mart.

3. The system of claim 1, wherein the data lineage configuration further identifies one or more data processing operations that are applied to the one or more data sets stored in the one or more data sources to implement the data analytics use case.

4. The system of claim 3, wherein the one or more data processing operations include one or more join operations that are applied to the one or more data sets and one or more transformation operations, one or more filter operations, or one or more aggregation operations that are applied to the one or more data sets prior to or after the one or more join operations are applied.

5. The system of claim 3, wherein the data lineage configuration further identifies an order in which the one or more data processing operations are applied to the one or more data sets.

6. The system of claim 1, wherein the one or more processors, to generate the source code, are configured to:
    invoke a template substitution engine to automatically replace the one or more tokens in the source code template with information that defines the one or more data sources, the one or more data sets, and the one or more data relations based on the structural metadata or serialized parameters encoded in the data lineage configuration and based on one or more rules specific to a programming language associated with the source code template.

7. The system of claim 1, wherein the source code template satisfies one or more constraints associated with a configuration of the data mart.

8. The system of claim 1, wherein the one or more processors are further configured to:
   receive a user input that includes a request related to the data lineage configuration or related to the one or more data processing operations that are applied to the one or more data sets to implement the data analytics use case.

9. The system of claim 1, wherein the one or more processors are further configured to:
   maintain an audit history that tracks interactions with the data mart over time based on the data lineage configuration.

10. The system of claim 1, wherein the one or more processors, to validate the source code, are configured to:
    execute the one or more test cases; and
    compare outputs of executing the one or more test cases and the set of expected outputs.

11. A method for generating source code, comprising:
    processing, by a device, a data lineage configuration,
       wherein the data lineage configuration is processed to identify one or more data sources that store one or more data sets associated with a data analytics use case and one or more data relations associated with the one or more data sets, and
       wherein the data lineage configuration is further processed to identify one or more data processing operations that are applied to the one or more data sets stored in the one or more data sources to implement the data analytics use case;
    parsing, by the device, a source code template that defines one or more functions to build a data mart and a data pipeline that enables the data analytics use case;
    automatically generating, by the device and after parsing the source code template, source code that is executable to build the data mart and the data pipeline to enable the data analytics use case based on the data lineage configuration and the source code template,
       wherein the source code template is parsed to identify one or more language-specific tokens to specify one or more elements that define the one or more data sources, the one or more data sets, the one or more data relations, and the one or more data processing operations identified in the data lineage configuration, and
       wherein the source code template is generated by automatically substituting language-independent structural metadata or serialized parameters included in the data lineage configuration for the language-specific tokens in the source code template;
    validating, based on automatically generating one or more test cases, the source code or the data pipeline,
       wherein the one or more test cases include a set of inputs and a set of expected outputs that are generated based on the data lineage configuration;
    executing the source code to build the data mart and the data pipeline from the one or more data sources to the data mart; and
    generating, based on the data lineage configuration, an interactive response to that includes details related to the data lineage configuration or details related to the one or more data processing operations that are applied to the one or more data sets to implement the data analytics use case.

12. The method of claim 11, wherein generating the source code includes:
    invoking a template substitution engine to automatically replace the one or more language-specific tokens in the source code template with language-independent structural metadata or serialized parameters in the data lineage configuration that defines the one or more data sources, the one or more data sets, and the one or more data relations.

13. The method of claim 11, wherein the source code template satisfies one or more constraints associated with a configuration of the data mart.

14. The method of claim 11, further comprising:
    executing the one or more test cases; and
    comparing outputs of executing the one or more test cases and the set of expected outputs.

15. A non-transitory computer-readable medium storing a set of instructions, the set of instructions comprising:
    one or more instructions that, when executed by one or more processors of a device, cause the device to:
       process a language-independent data lineage configuration associated with a data analytics use case,
          wherein the language-independent data lineage configuration includes structural metadata or serialized parameters that identify one or more data sources that store one or more data sets associated with the data analytics use case and identify one or more data relations associated with the one or more data sets;
       process a language-specific source code template that defines one or more functions to build a data mart and a data pipeline that enables the data analytics use case,
          wherein the language-specific source code template includes one or more tokens to specify elements that define the one or more data sources, the one or more data sets, and the one or more data relations identified in the language-independent data lineage configuration;
       automatically generate, after parsing the source code template, source code that is executable to build the data mart and the data pipeline to enable the data analytics use case based on the structural metadata or serialized parameters included in the language-independent data lineage configuration and the one or more tokens in the language-specific source code template,
          wherein the one or more instructions that cause the device to generate the source code further cause the device to:
             invoke a template substitution engine to replace the one or more tokens in the language-specific source code template with information in the language-independent data lineage configuration that defines the one or more data sources, the one or more data sets, and the one or more data relations associated with the one or more tokens;
       validate, based on automatically generating one or more test cases, the source code or the data pipeline,
          wherein the one or more test cases include a set of inputs and a set of expected outputs that are generated based on the language-independent data lineage configuration; and
       generate, based on the language-independent data lineage configuration, an interactive response to that includes details related to the language-independent data lineage configuration or details related to one or more data processing operations that are applied to the one or more data sets to implement the data analytics use case.

16. The non-transitory computer-readable medium of claim 15, wherein the one or more instructions further cause the device to:
 execute the source code to build the data mart and the data pipeline from the one or more data sources to the data mart.

17. The non-transitory computer-readable medium of claim 15, wherein the language-independent data lineage configuration further identifies one or more data processing operations that are applied to the one or more data sets stored in the one or more data sources to implement the data analytics use case.

18. The non-transitory computer-readable medium of claim 15, wherein the one or more instructions further cause the device to:
 receive a user input that includes a request related to the language-independent data lineage configuration or related to the one or more data processing operations that are applied to the one or more data sets to implement the data analytics use case.

19. The non-transitory computer-readable medium of claim 15, wherein the one or more instructions further cause the device to:
 maintain an audit history that tracks interaction with the data mart over time based on the language-independent data lineage configuration.

20. The non-transitory computer-readable medium of claim 15, wherein the one or more instructions further case the device to:
 execute the one or more test cases; and
 compare outputs of executing the one or more test cases and the set of expected outputs.

\* \* \* \* \*